United States Patent
Gong et al.

(10) Patent No.: US 9,743,273 B2
(45) Date of Patent: Aug. 22, 2017

(54) METHOD AND APPARATUS FOR MEDIUM ACCESS GROUP ASSIGNMENT

(75) Inventors: Michelle X. Gong, Sunnyvale, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,596

(22) PCT Filed: Oct. 1, 2011

(86) PCT No.: PCT/US2011/054469
§ 371 (c)(1),
(2), (4) Date: Mar. 21, 2014

(87) PCT Pub. No.: WO2013/048520
PCT Pub. Date: Apr. 4, 2013

(65) Prior Publication Data
US 2014/0198723 A1    Jul. 17, 2014

(51) Int. Cl.
*H04W 8/26* (2009.01)
*H04W 74/00* (2009.01)
*H04W 76/02* (2009.01)

(52) U.S. Cl.
CPC ........... *H04W 8/26* (2013.01); *H04W 74/006* (2013.01); *H04W 76/021* (2013.01)

(58) Field of Classification Search
CPC ..... H04W 8/26; H04W 40/24; H04W 74/006; H04W 76/021
See application file for complete search history.

(56) References Cited

U.S. PATENT DOCUMENTS

| | | | |
|---|---|---|---|
| 2005/0157674 A1 | 7/2005 | Wentink | |
| 2006/0050742 A1 | 3/2006 | Grandhi et al. | |
| 2006/0164969 A1* | 7/2006 | Malik et al. | 370/203 |
| 2008/0181161 A1* | 7/2008 | Gi Kim | H04W 72/005 370/312 |
| 2009/0296619 A1* | 12/2009 | Sammour | H04W 4/08 370/311 |
| 2009/0303930 A1* | 12/2009 | Ashley | H04W 16/14 370/328 |
| 2010/0189021 A1 | 7/2010 | He et al. | |

(Continued)

FOREIGN PATENT DOCUMENTS

WO    2013/048520 A1    4/2013

OTHER PUBLICATIONS

International Preliminary Report on Patentability and Written Opinion received for PCT Patent Application No. PCT/US2011/054469, mailed on Apr. 10, 2014, 7 pages.

(Continued)

*Primary Examiner* — Feben M Haile
(74) *Attorney, Agent, or Firm* — Schiff Hardin LLP

(57) ABSTRACT

Systems and methods for implementing a medium access group assignment of stations (STAs) are disclosed. An access point (AP) device may be configured to allocate a chosen beacon interval to a medium access group (MAG). Further, the AP device may assign STAs to different MAGs. After assignment to a particular MAG, the STAs that are associated to the particular MAG may use the configured beacon interval during transmission and reception of messages.

21 Claims, 5 Drawing Sheets

(56) References Cited

U.S. PATENT DOCUMENTS

| | | | |
|---|---|---|---|
| 2011/0013608 A1* | 1/2011 | Lee .................. | H04W 72/04 370/338 |
| 2011/0040969 A1 | 2/2011 | Yao et al. | |
| 2011/0199966 A1* | 8/2011 | Cordeiro ............ | H04W 16/14 370/328 |
| 2011/0292925 A1* | 12/2011 | Ho .................. | H04W 88/08 370/338 |

OTHER PUBLICATIONS

International Search Report and Written Opinion Received for PCT Patent Application No. PCT/US2011/054469, Mailed on May 10, 2012, 11 pages.

* cited by examiner

| Frame Header 402 | Association Identification (AID) 404 | Medium Access Group Identification (MAG ID) 406 | MAG Schedule 408 |

FIG. 4a

| Element Identification 410 | Length 412 | Start target beacon transmission time (Start TBTT) 414 | Interval 416 |

FIG. 4b

METHOD AND APPARATUS FOR MEDIUM ACCESS GROUP ASSIGNMENT

BACKGROUND

Before wireless communication networks, setting up a computer network in a business or residential area often required running cables through walls and ceilings in order to deliver network access to all of network-enabled devices. With the creation of a wireless Access Point (AP), network users may be able to add the network-enabled stations (STAs) or devices that access a network with few or no cables. The AP may support one or more standards or specifications for sending or receiving data using radio frequencies. The Institute of Electrical and Electronics Engineers or IEEE provides standards, such IEEE 802.11, that defines frequencies of the AP.

Despite recent technologies to improve performance of wireless communications networks, to be on par with wired communications networks, network congestion and instability may still be a common problem. For example, when a large number of STAs (e.g., laptop computers, tablet computers, smart phones, etc.) associated to an AP contend for media at the same time, collisions may occur. Further, traffic indication map (TIM) in the AP that identifies buffer frames for sleeping STAs may become very large and waste significant medium time. Under the current IEEE 802.11 standard, the AP does not schedule different STAs into different beacon interval for medium access purposes.

In the 802.11 standard, the AP indicates whether there is buffered downlink traffic for a STA in the TIM element. The corresponding bit may be set to I for multiple consecutive beacon intervals until the buffered traffic is cleared. However, when there are many STAs in a basic service set (BSS), the TIM element can become very big, which may cause an overly bloated beacon frame.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

FIG. 4a is a block diagram illustrating an association response frame.

FIG. 4b is a block diagram illustrating a medium access schedule element for the stations (STAs).

DETAILED DESCRIPTION

Overview

Figure 1:
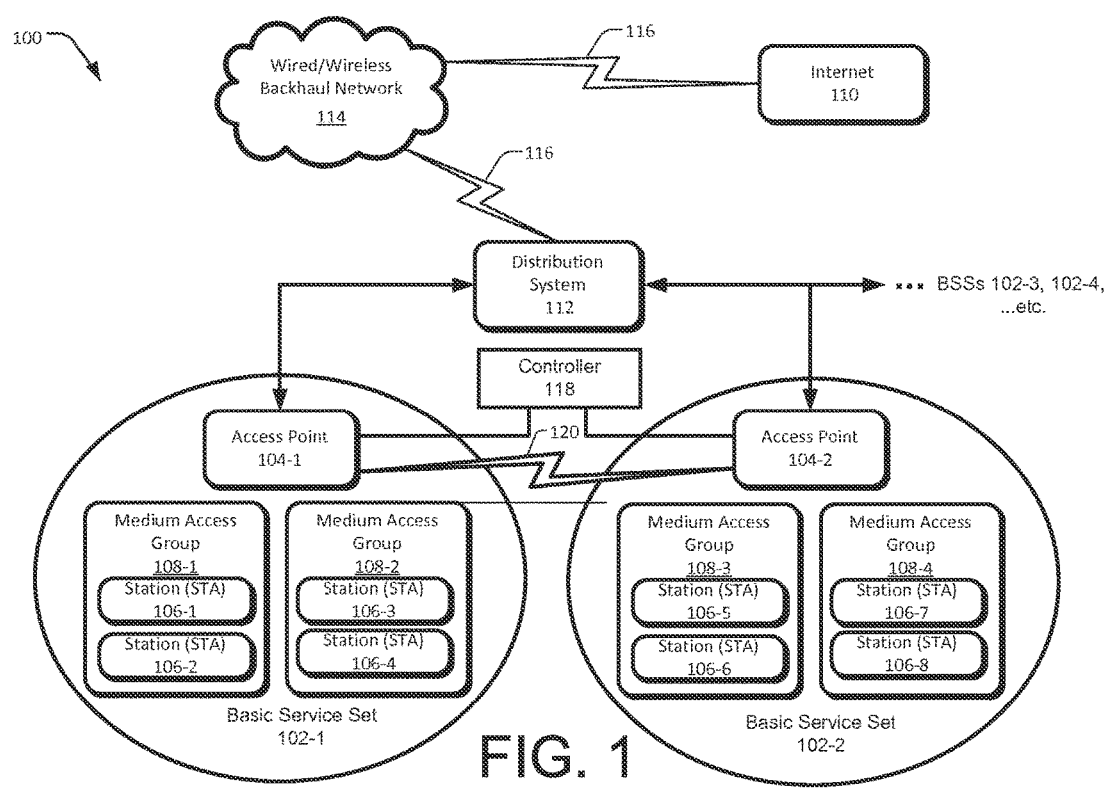
FIG. 1 is a block diagram illustrating an example system implementing an environment for medium access group assignment.

An access point (AP) device may collaborate with other AP device for allocation of beacon intervals. After the collaboration, the AP device and the other AP device may choose one or more non-overlapping beacon intervals to be used for transmission and reception of data. In an implementation, the AP device may configure the chosen beacon intervals to a medium access group (MAG). In another implementation, the AP device may assign an STA to a particular MAG. For example, the AP device assigns STAs 1 and 2 to a first MAG, while STAs 3 and 4 are assigned to a second MAG. In this example, the STAs 1 and 2 may operate only on the beacon intervals configured by the AP device to the first MAG. Furthermore, the STAs 1 and 2 may clear buffered frames traffic at the AP and destined for the STAs 1 and 2. by downloading the buffered frames within the beacon intervals configured to the first MAG. The downloading of the buffered frames may include a compressed traffic indication map (TIM) element when the STAs 1 and 2 include a contiguous association identification.

In an implementation, an AP indicates buffered traffic for STAs that will transmit/receive in the current beacon interval. The bit that corresponds to a STA is cleared in the next beacon regardless of whether the STA has downloaded the buffered traffic or not. A STA may download the buffered traffic in other beacon intervals as long as the STA has received one TIM element in its designated beacon interval with the corresponding bit set to one. Furthermore, STAs may be grouped with consecutive association identifications (AIDS) into one medium access group. This way, the TIM element may be compressed in each beacon, because a contiguous subset of STAs is to he included.

Described herein are architectures, platforms and methods that mitigate collisions in a wireless communications network. The collisions may arise when STAs, which are associated to an AR contend to access the same medium and at the same time in a basic service set (BSS). The AP that controls the associated STAs may be configured to subdivide the associated STAs into medium access groups (MAGs). The subdivided STAs may be limited to transmit or receive messages in one or more beacon intervals allocated by the AP to the MAG that contains the subdivided STAs.

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one, The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term access point (AP) as used herein, is defined as an entity that has STA functionality and provides access to the distribution services, via the wireless medium or WM for associated STAs. The terms "traffic" and/or "traffic stream(s)" as used herein, are defined as a data flow and/or stream between wireless devices such as STAs. The term "session" as used herein is defined as state information kept or stored in a pair of stations that have established a direct physical link (e.g., excludes forwarding); the state information may describe or define the session. The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as an AP stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (UPS) device, a device which incorporates a UPS receiver or transceiver or chip, a device which incorporates an RFID element or chip, a Multiple Input Multiple Output (MIMO) transceiver or device, a Single input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with suitable limited-range or short-range wireless communication networks, for example, "piconets", e.g., a wireless area network, a WVAN, a WPAN, and the like.

Example System

FIG. 1 illustrates an example system 100 that employs WLAN STAs in one or more BSS. In certain implementations, a BSS 102-1 includes an access point (AP) 104-1 that serves or controls STAs 106 (e.g., STAs 106-1, 106-2, 106-3, and STA 106-4). The STAs 106-1 and 106-2 may be group elements of medium access group (MAG) 108-1, while the STAs 106-3 and 106-4 may be group elements of MAG 108-2. The BSS 102-1 may include a large coverage area such as a cellular network, or a small coverage area such as a commercial building or a house. The STAs 106 may include a laptop, personal digital assistants (PDA), a mobile device, and the like. Furthermore, the STAs 106 may be understood to include other devices. FIG. 1 describes the system 100 for illustration purposes only however, greater number of BSSs, MAGs, and STAs 106 may he included.

In an implementation, the AP 104-1 may include devices that allow wireless associated STAs 106 to communicate with other links such as the Internet 110. In another implementation, the AP 104-1 may collaborate with another AP (e.g., AP 104-2) for allocation of different beacon intervals. After collaboration, the beacon intervals allocated and chosen by the AP (e.g., AP 104-1) may he configured in each of the MAGs (e.g., MAG 108-1, MAG 108-2) that are associated with the AP (e.g., AP 104-1). For example, if the AP 104-1 is allocated with beacon intervals 1 and 2, and the AP 104-1 includes two MAGs MAG 108-1, MAG 108-2), then the MAG 108-1 or the MAG 108-2 may separately use the beacon intervals 1 and 2 during active states. In this example, if the MAG 108-1 currently uses the beacon intervals 1 and 2, then the MAG 108-2 may be configured to use the beacon intervals 1 and 2 at some other schedule or period. In certain implementations, the MAG (e.g., MAG 108-1) that is in the active state may allow transmission and reception of messages from the STAs (e.g., STAs 106-1 and 106-2) that are associated to the MAG (e.g., MAG 108-1). In another implementation, the associated STAs (e.g., STAs 106-1 and 106-2) may include a contiguous association identification (AID) to compress traffic indication map (TIM) element as further discussed in FIG. 2.

In an implementation, the AP (e.g., AP 104-1) may be configured to subdivide the STAs 106 into multiple number of MAG 108. For example, if there are one hundred (100) STAs 106 that are associated with the AP (e.g., AP 104-1), then the AP (e.g., AP 104-1) may be configured to subdivide the 100 STAs into four (4) MAG 108 (e.g., MAGs 108-1, 108-2, 108-3, and 108-4). In this example, each MAG 108 (e.g., MAG 108-1) may include twenty five (25) STAs (i.e., 100 STAs divided by 4 MAGs=25 STAs/MAG) that are scheduled to use the configured beacon intervals in the MAG 108 (e.g., MAG 108-1) during the active state. In FIG. 1, and for illustration purposes only, the BSS 102-1 includes the AP 104-1 that has 2 MAGs (e.g., MAG 108-1 and MAG 108-2) with 4 associated STAs (e.g., STAs 106-1 106-2, 106-3, and STA 106-4).

In an implementation, the AP (e.g., AP 104-1) may respond to a request by a particular STA (e.g., STA 106-1) that intends to join the BSS (e.g., BSS 102-1). In this implementation, the AP 104-1 may assign the STA 106-1 to a particular MAG (e.g., MAG 108-1). After assignment, the AP 104-1 may inform the STA 106-1 by transmitting an association response frame, which includes operation parameters for the STA 106-1. For example, the AP 104-1 transmits the association response frame in response to an association request frame sent by an associating STA (e.g., STA 106-1), The association response frame may include operation parameters such as the beacon intervals to use by the STA (e.g., STA 106-1) and the MAG MAG 108-1) assignment. In this example, the STA 106 (e.g., STA 106-1) may operate on the beacon intervals defined in the association response frame when the MAG 108-1 is in active state. On the other hand, the other STAs (e.g., STAs 106-3 and 106-4) that are not associated with the MAG 108-1 may turn to sleep mode state. In certain implementations, the other STAs (e.g., STAs 106-3 and 106-4) that are in the sleep mode state may reduce unnecessary waiting times for clearing buffer frames traffic. For example, the other STAs (e.g., STAs 106-3 and 106-4) by analyzing the association response frame from the AP (e.g., AP 104-1) may determine when to download buffer frames from the AP and when to transmit to the AP.

In an implementation, the AP 104-1 may be connected to another AP (e.g., AP 104-2) through a distribution system (DS) 112. The DS 112 may include a system enabling wireless interconnection of the APs APs 104-1, 104-2, etc.) in an IEEE 802.11 network. In another implementation, the DS 112 may allow the WLAN to be expanded using multiple APs (e.g., APs 104-1, 104-2, 104-3, etc. that are respectively located in BSSs 102-1, 102-2, 102-3, etc.). The expansion may not require the traditional requirement for a wired backbone to link together the APs APs 104-1, 104-2, 104-3, etc).

In an implementation, the DS 112 may connect the APs 104-1 and 104-2 to a wired or wireless backhaul network 114. The wired or wireless backhaul network 114 may serve as intermediate links between the BSSs 102-1, 102-2, etc. to other servers or links (e.g., Internet 110) using a wireless connection 116. Traffic or traffic streams are sent through the wireless connection 116. In addition, the wireless connection 116 may be a directed or beam formed link between the DS 112 and the wired or wireless backhaul network 114. In another implementation, the AP 104-2 may include MAC 108-3 and MAG 108-4. The MAC 108-3 may contain STAs 106-5 and 106-6; while the MAG 108-4 may contain STAs 106-7 and 106-8. The MAGs 108-3 and 108-4, STAs 106-5 to 106-8, and the AP 104-2 that are included in the BSS 102-2 may function or operate in the same manner as the MAGs, STAs, and the AP 104-1 that are included in the BSS 102-1 as discussed above.

In an implementation, the APs 104-1, 104-2, . . . etc. may collaborate with each other to allocate different beacon interval allocations to be used in the transmission and reception of data. The beacon interval may include a period between two successive transmission of a beacon signal. The collaboration between the APs 104-1, 104-2, etc may include exchange of a beacon schedule frame. The beacon schedule frame may include the beacon interval information that may be used currently by the collaborating APs APs 104-1, 104-2, etc). Accordingly, the collaborating APs APs 104-1, 104-2, etc) may choose non-overlapping beacon intervals in order to mitigate overlapping BSS (OBSS) interference in the BSS 102 (e.g., BSS 102-1, 102-2, etc.). In another implementation, the beacon schedule frame may be exchanged by the collaborations APs (e.g., APs 104-1, 104-2, etc.) through a controller 118, or through a wireless connection 120. The controller 118 may include a layer 3 router device that connects and controls the collaboration between the APs (e.g., APs 104-1, 104-2, etc.), The wireless connection 120 may include the standard 802.11 medium access method. In another implementation, the allocated different beacon intervals in the APs APs 104-1, 104-2., etc.) may mitigate the OBSS interference and avoid congestion such that the wireless communications network can scale to a large number of nodes (e.g., expanded APs). The collaboration of the APs APs 104-1, 104-2, . . . etc) to allocate different beacon intervals may work for both enhanced distributed channel access (EDGA) and hybrid coordination function controlled channel access (HCCA).

Example Access Point

Figure 2:
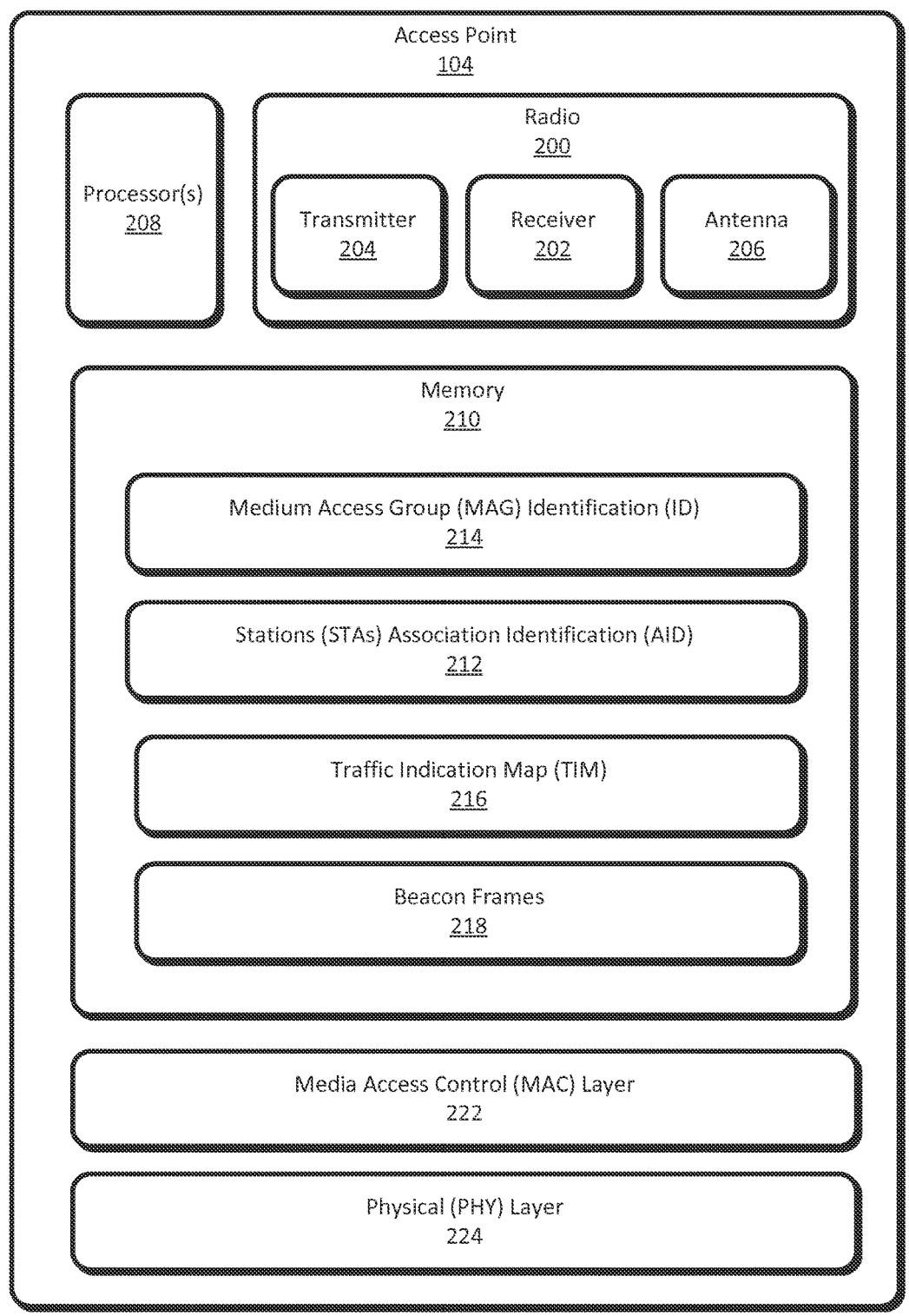
FIG. 2 is a block diagram illustrating an example access point (AP) device that implements a) assigning of stations (STAs) to a medium access group (MAC) and b) a mechanism to optimize the assignment of the STAs.

FIG. 2 is an example implementation of the AP 104. The AP 104 may include a radio 200 that includes a receiver 202., a transmitter 204, and one or more antenna 206. In certain implementations, the radio 200 is based on the IEEE 802.11ah standard, operating in the sub 1 GHz range.

The AP 104 includes one or more processor(s) 208. Processor(s) 208 may be a single processing unit or a number of processing units, all of which may include single or multiple computing units or multiple cores. The processor 208 may be implemented as one or more microprocessors, microcomputers, microcontrollers, digital signal processors, central processing units, state machines, logic circuitries, and/or any devices that manipulate signals based on operational instructions. Among other capabilities, the processor 208 may be configured to fetch and execute computer-readable instructions or processor-accessible instructions stored in a memory 210 or other computer-readable storage media.

The AP 104 may be configured to collaborate with other APs (e.g., if AP 104 is AP-104-1, the other APs may be APs 104-2, 104-3, etc.). The collaboration may result to allocations of one or more beacon intervals in the APs (e.g., APs 104-1, 104-2, 104-3, etc). The one or more beacon intervals may be used by one or more MACS (e.g., MAC 108-1 and MAG 108-2) configured in the APs APs 104-1, 104-2, 104-3, etc). For example, if the AP 104-1 is allocated with beacon intervals 1 and 2, and the AP 104-1 includes two MACs (e.g., MAC 108-1 and 108-2), then each MAG (e.g., MAG 108-1) may use the beacon intervals 1 and 2 during active states. In an implementation, the AP 104 may receive through the receiver 202, an association request frame from the STA (e.g., STA 106-1) that intends to associate with the AP 104. In response to the association request frame from the STA 106-1. the AP 104 transmits an association response frame through the transmitter 204. In certain implementations, the association response frame may include two (2) octet association identification (AID) and a two (2) octet medium access group (MAC) identification (ID). The 2 octet AID for the STA (e.g., STA 106-1) may be stored in STAs AID component 212. The 2 octet MAC ID for the STA (e.g., STA 106-1) may further be stored in MAG ID component 214. In certain implementations, the association response frame may identify the one or more beacon intervals that the STA 106-1 should wake up to for transmission and reception of messages. In other words, the STA 106-1 may transmit or receive messages only in the identified one or more beacon intervals defined in the association response frame.

In an implementation, the AP 104-1 may indicate presence of a buffered down ink traffic for the STA 106-1 that is associated with the BSS 102-1. The presence of the buffered downlink traffic may be stored in a traffic indication map (TIM) component 216. In certain implementations, the STA 106-1 may download buffered frames at the AP during the period of operation defined by the medium access schedule in the association response frame. For example, the STA 106-1 may download the buffered frames during the beacon interval that is configured for the STA 106-1 to operate upon. In other words, the TIM in the beacon frame may not become bloated because of scheduling configured in the STAs (e.g., STA 106-1, 106-2, etc.)

In an implementation, the TIM 216 may be transmitted in beacon frames that are stored in beacon frames component 218, The beacon frames may be generated in the processor(s) 208. The processor(s) 208 may further access a Media Access Controller (MAC) layer 222 that inserts a value of the association response frame to a field in the beacon frame. In another implementation, the beacon frames 218 stores the beacon intervals currently used by the AP 104.

In certain implementations, the memory component 210 is an example of computer-readable storage media for storing instructions which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 210 as a particular machine configured for carrying out the operations and functions described in the implementations herein.

Generally, any of the functions described with reference to the figures can be implemented using, software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Station

Figure 3:
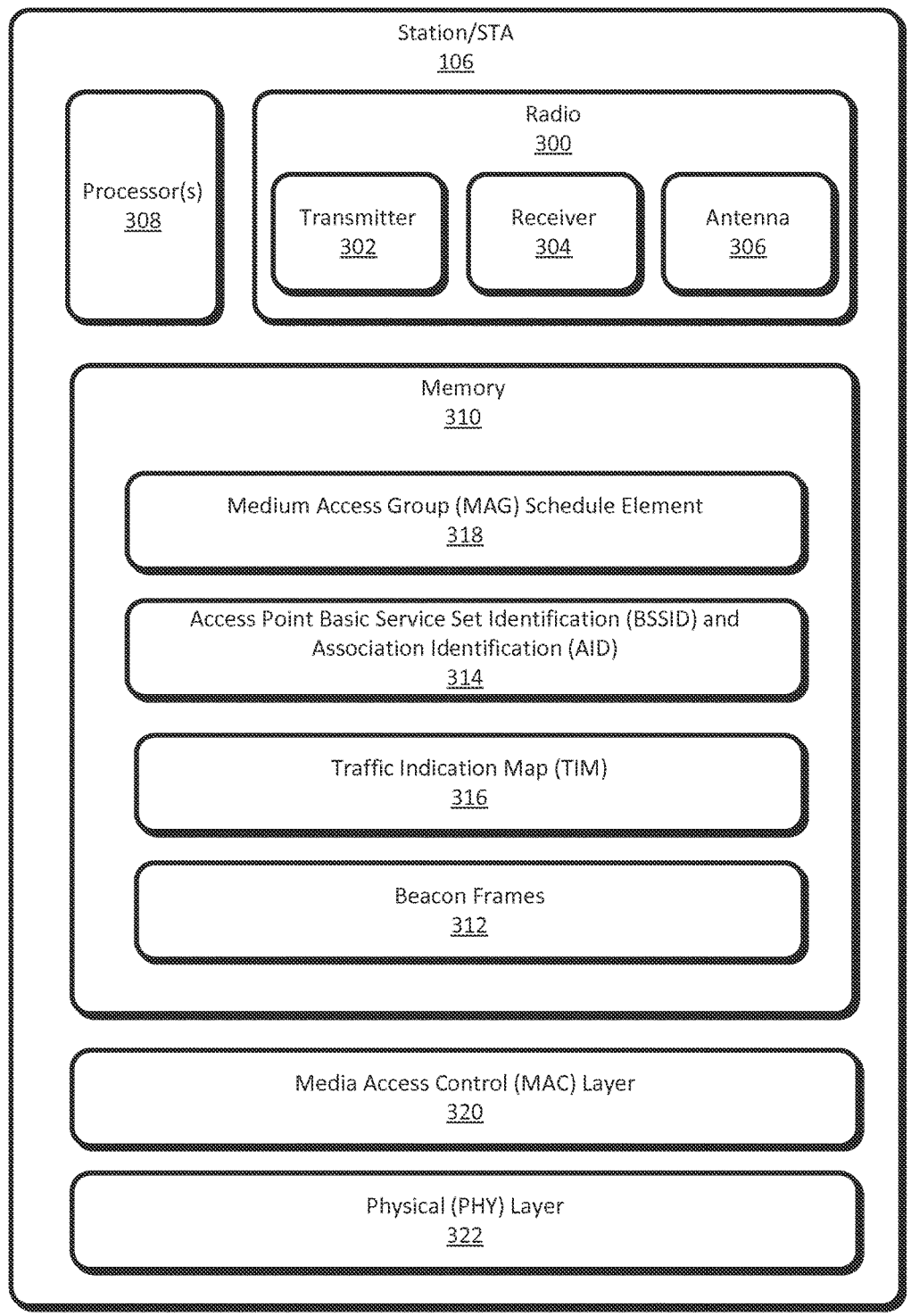
FIG. 3 is a block diagram illustrating an example station device that opts assignment lade by an Access Point (AP) device.

FIG. 3 is an example implementation of a station or STA 106. The STA 106 may include a radio 300 that includes a transmitter 302, a receiver 304 and one or more antenna 306. In certain implementations, the radio 300 is based on the IEEE 802.11ah standard, operating in the sub 1 GHz range.

STA 106 includes one or more processor(s) 308. Processor(s) 308 may be a single processing unit or a number of processing units, all of which may include single or multiple computing units or multiple cores. The processor(s) 308 may be implemented as one or more microprocessors, microcomputers, microcontrollers, digital signal processors, central processing units, state machines, logic circuitries, and/or any devices that manipulate signals based on operational instructions. Among other capabilities, the processor(s) 308 may be configured to fetch and execute computer-readable instructions or processor-accessible instructions stored in a memory 310 or other computer-readable storage media.

In an implementation, the STA 106 may adopt the beacon interval allocations configured on the APs (e.g., APs 104-1, 104-2, . . . etc.). In particular, the STAs 106-1 and 106-2 may adopt the configuration and status of the AP (e.g., AP 104-1) to which the STAs 106-1 and 106-2 are associated with the BSS (e.g., BSS 102-1). In an implementation, the STA (e.g., STA 106-1) may include periodically receiving a beacon frame from the AP 104-1 using the receiver 304. The beacon frame may include the association response frame that includes: a) the beacon interval allocated to the AP 104-1, b) the MAG ID for the STA 106-1, and c) the AID for the STA 106-1. In an implementation, the STA (e.g., STA 106-1) analyzes the received beacon frames and stores the beacon frames in beacon frames 312 of the memory 310. The beacon frames may further include the BSSID of the transmitting AP (e.g., AP 104-1). The BSSID may be stored in BSSID and AID component 314 of the memory 310. In another implementation, the beacon frame may include the AID for the STA 106-1. The AID may be stored at the BSSID and AID component 314 of the memory 310. In another implementation, the received beacon frame may include the TIM for the STA 106-1 The TIM may be stored in TIM component 316. In certain implementations, the received beacon frame may include MAG schedule element that defines the operation parameters for the STA 106-1. The operation parameters may be stored in MAG schedule element component 318. The operation parameters may include an element identification, length, etc. and further discussed in FIG. 4B.

In an implementation, the STA (e.g., STA 106-1) may communicate with the AP (e.g., AP 104-1) when the STA 106-1 joins the BSS (e.g., BSS 102-1). The communication by the STA 106-1 may be initiated at the processor(s) 308. For example, the processor(s) 308 may access a media access control or MAC layer 320 to generate a first frame that contains a request by the STA (e.g., STA 106-1) to join the BSS 102-1. The first frame may be transformed into wireless signals by a physical layer or PH Y 322 prior to transmission at the transmitter 302. In certain implementations, the first frame may include association request frame from the STA 106. The association request frame may include a request from the STA 106 to determine the STA 106's AID MAC ID, the beacon intervals to use, and if there. is a buffered traffic frames for the STA 106 to clear.

In certain implementations, the memory component 310 is an example of computer-readable storage media for storing instructions which are executed by the processor(s) 308 to perform the various functions described above. For example, memory 310 may generally include both volatile memory and non-volatile memory (e.g., RAM, ROM, or the like). Memory 310 may he referred to as memory or computer-readable storage media herein. Memory 310 is capable of storing computer-readable, processor-executable program instructions as computer program code that may he executed by the processor(s) 308 as a particular machine configured for carrying out the operations and functions described in the implementations herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

FIG. 4a is an example implementation of a frame format 400 for an association response frame transmitted by the AP (e.g., AP 104-1) in response to an association request frame sent by the STA (e.g., STA 106-1). In an implementation, the STA (e.g., 106-1) that joins a BSS (e.g., BSS 102-1) may send the association request frame to the AP (e.g., AP 104-1). In certain implementations, the AP 104-1 may reply to the association response frame by sending a beacon frame that includes a frame header 402, an association identification (AID) 404, a MAC identification (MAG ID) 406, and a MAG schedule 408. The frame header 402 in the beacon frame may include a media access control address (MAC address) to identify source (e.g., AP 104-1) and destination (e.g., STA 106-1) of the beacon frame. The AID 404 may include the identification of the STA 106-1 that is associated with the AP 104-1. In other words, the STA 106-1 may be under the control and supervision of the AP 104-1 based on the AID. The MAG ID 406 may include the particular MAG to which the STA 106-1 is assigned. The MAG schedule 408 may include the beacon intervals used by the MAG to which the STA 106-1 is assigned.

FIG. 4b is an example implementation of a frame format for an information element (IE) that represents medium access schedule element. In an implementation, the IE includes an element identification 410, a length 412, a start target beacon transmission time (Start TBTT) 414, and an interval 416, The element identification 410 may identify the medium access schedule element that is included in the association response frame transmitted by the AP 104-1. The length 412 length 412 may identify a period for the beacon interval used by the AP 104-1. The start TBTT 414 may define the interval in the number of beacons between two successive beacon intervals in which the STA (e.g., STA 106-1) can participate. The interval 416 may define the beacon intervals to which the STA can participate.

Example Method

Figure 5:
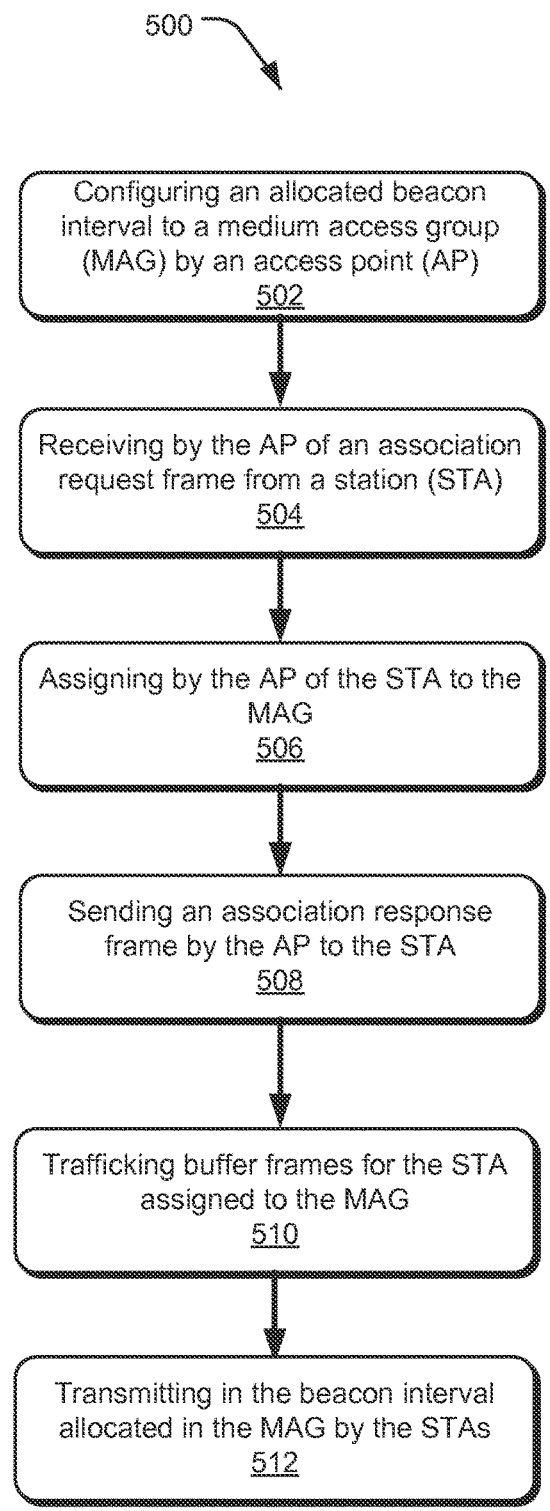
FIG. 5 is a flow chart illustrating an example of implementing medium access group assignment of stations (STAs).

FIG. 5 illustrates an example method 500 for implementing medium access group assignment of STAs. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, configuring by an AP of allocated beacon interval to a medium access group (MAG) is performed. In an implementation, the AP (e.g., AP 104-1) may be configured to collaborate with other APs (e.g., AP 104-2, 104-3, etc.) for beacon interval allocations. After collaboration, each AP may choose the allocated beacon intervals that may not overlap with the other beacon intervals chosen by the other APs (e.g., AP 104-2, 104-3, etc.). The different beacon interval allocations in the APs (e.g., AP 104-1, 104-2, 104-3, etc.) may mitigate OBSS interference. In another implementation, the AP (e.g., AP 104-1) may configure the allocated beacon interval for use in a MAG (e.g., MAG 108-1).

At block 504, receiving an association request frame by the AP is performed. In an implementation, the AP (e.g., AP 104-1) may receive the association request frame from an STA (e.g., STA 106-1), The STA (e.g., STA 106-1) may intend to join a BSS (e.g., BSS 102-1) that is controlled by the AP (e.g., AP 104-1). To this end, the STA (e.g., STA 106-1) may send the association request frame to the AP (e.g., AP 104-1).

At block 506, assigning by the AP of the STA to a particular MAG is performed. In an implementation, the AP (e.g., AP 104-1) may be configured to assign the requesting STA (e.g., STA 106-1) to join a particular MAG (e.g., MAG 108-1). In another implementation, the AP (e.g., AP 104-1) may be configured to re-organize medium access in the BSS (e.g., BSS 102-1) by taking into consideration the association of the requesting STA (e.g., STA 106-1) with other currently associated STAs (e.g., STAs 106-2, 106-3, and 106-4). For example, if the association of the requesting STA (e.g., STA 106-1) produces a total of four associated STAs STAs 106-1, 106-2, 106-3, and 106-4) in the BSS (e.g., BSS 102-1), then the AP (e.g., AP 104-1) may group the four STAs into two MACs (e.g., MACs 108-1 and 108-2). In other words, MAC 108-1 may include STAs 106-1 and 106-2 in the first group; and the MAG 108-2 may include STAs 106-3 and 106-4 in the second group.

At block 508, sending an association response frame is performed. In an implementation, the AP (e.g., AP 104-1) may send the association response frame to inform the requesting STA (e.g., STA 106-1) of the assignment. In certain implementations, the association response frame may include association identification (AID), MAG identification, and MAG schedule for the requesting STA (e.g., 106-1) The association response frame is demonstrated. in FIG. 4a.

At block 510, trafficking buffer frames for the STA assigned to the particular MAG is performed. In an implementation, the AP (e.g., AP 104-1) may contain buffered frames for the STAs STAs 106-1, 106-2, 106-3, and 106-4) in the BSS (e.g., BSS 102-1). The AP (e.g., AP 104-1) may be configured to traffic buffer frames for the STAs (e.g., STAs 106-1 and 106-2) that are currently using the beacon interval configured in the MAG (e.g., MAG 108-1). In other words, the AP (e.g., AP 104-1) processes or clears traffic indication map (TIM) for the STAs STAs 106-1 and 106-2) that are in the active state. In another implementation, the STAs STAs 106-1 and 106-2) associated with MAG 108-1 may include contiguous AIDs in order to compress TIM elements in a beacon frame. The beacon frame may include the association response frame transmitted by the AP 104-1 to the STA 106-1.

At block 512, transmitting by the STA on the allocated beacon interval is performed. In an implementation, a transmitter (e.g., transmitter 202) of the AP 104-1 may transmit information using the allocated beacon interval chosen by the AP 104-1. The transmitted information may include messages from the STA (e.g., STA 106-1) that is associated with the active MAG (e.g., MAC 108-1)

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method performed by an access point (AP) for organizing stations (STAs), the method comprising:
    collaborating by the AP with one or more other APs to allocate a beacon interval that does not overlap with beacon intervals chosen by the one or more other APs;
    configuring the allocated beacon interval to a plurality of medium access groups (MAGs);
    receiving an association request frame from a STA to join the AP;
    assigning of the STA to a particular MAG in the plurality of MAGs, the assigning includes initially associating the requesting STA to the particular MAG;
    reorganizing the plurality of MAGs based on the initial association of the requesting STA to the particular MAG and current associations of other STAs to the particular MAG or to another MAG in the plurality of MAGs, wherein the reorganizing includes grouping equal number of STAs for each MAG in the plurality of MAGs;
    sending an association response frame to the STA, the association response frame comprises a traffic indication map (TIM) element; and
    trafficking buffer frames for the grouped STAs assigned to each MAG, wherein the trafficking comprises compressing the TIM element in the beacon interval by assigning the grouped STAs with contiguous association identifications (AIDs).

2. The method of claim 1, wherein the grouping equal number of STAs for each MAG includes a final destination of each STA to a corresponding MAG in the plurality of MAGs.

3. The method of claim 1, wherein the association response frame includes an association identification (AID) for the STA.

4. The method of claim 1, wherein the association response frame includes a MAG identification for the STA.

5. The method of claim 1, wherein the association response frame includes a MAG schedule for the STA.

6. The method of claim 5, wherein the STA receives one TIM element for a designated beacon interval.

7. A wireless communications network comprising:
    an access point (AP) device that receives an association request frame from a station (STA), wherein the AP device: initially associates the STA to a particular medium access group (MAG) in a plurality of MAGs; reorganizes the plurality of MAGs based on the initial association of the STA to the particular MAG and current associations of other STAs to the particular MAG or an other MAG in the plurality of MAGs, wherein the reorganizing includes grouping equal number of STAs for each MAG in the plurality of MAGs; and informs the STA of MAG assignment by sending an association response frame that includes a beacon interval configured by the AP device to the MAG, wherein a traffic indication map (TIM) element of the association response frame is compressed by assigning the grouped STAs with contiguous association identifications (AIDs); and
    a STA, associated with the AP device, wherein the STA adopts association response frame during the transmission of messages by the STA.

8. The wireless communications network of claim 7, wherein the MAG assignment includes a final destination of each STA to a corresponding MAG in the plurality of MAGs.

9. The wireless communications network of claim 7, wherein the association response frame includes each association identification (AID) for the STA.

10. The wireless communications network of claim 7, wherein the association response frame includes MAG identification for the STA.

11. The wireless communications network of claim 7, wherein the association response frame includes a medium access schedule.

12. The wireless communications network of claim 7, wherein the AP device traffics buffer frames for the STA that are assigned to the MAG.

13. The wireless communications network of claim 12, wherein the STA receives one TIM element for a designated beacon interval.

14. An access point (AP) device comprising:
    one or more processors configured to:
    initially associate a requesting station (STA) to a particular medium access group (MAG) in a plurality of MAGs;
    reorganize the plurality of MAGs based on the initial association of the requesting STA to the particular MAG and current associations of other STAs to the particular MAG or an other MAG in the plurality of MAGs, wherein the reorganizing includes grouping equal number of STAs for each MAG in the plurality of MAGs;
    generate an association response frame that includes an association identification (AID), traffic indication map (TIM), MAG identification, and medium access schedule for the requesting STA, wherein the TIM is compressed by assigning the grouped STAs with contiguous association identifications (AIDs);

a memory configured to the one or more processors and configured to store beacon frames that include the association response frame; and a transmitter to wirelessly transmit the beacon frames.

15. The AP device of claim 14, wherein the AID includes contiguous AIDs for STAs that are associated in one MAG.

16. The AP device of claim 14, wherein the medium access schedule is an information element that includes a start target beacon transmission time (Start TBTT).

17. The AP device of claim 16, wherein the start TBTT defines starting point of a beacon interval operation for the STA.

18. The AP device of claim 16, wherein the information element includes a beacon interval configured by the AP device to the MAG.

19. The AP device of claim 16, wherein the information element includes an element identification (element ID) that identifies the medium access schedule included in the association response frame.

20. A method performed by an access point (AP) of a basic service set (BSS) comprising:

receiving an association request frame from a station (STA) to join the BSS;

assigning of the STA to a particular medium access group (MAG) in a plurality of MAGs in the BSS, the assigning includes initially associating the requesting STA to the particular MAG;

reorganizing the plurality of MAGs based on the initial association of the requesting STA to the particular MAG and current associations of other STAs to other MAGs in the plurality of MAGs, the reorganizing includes grouping equal number of STAs for each MAG in the plurality of MAGs;

sending an association response frame to the STA, the association response frame comprises a traffic indication map (TIM) element; and indicating buffered traffic for the STA to transmit/receive in a current beacon interval, wherein the indicating buffered traffic comprises compressing the TIM element in the current beacon interval by assigning the grouped STAs with contiguous association identifications (AIDs).

21. The method of claim 20, wherein the grouping equal number of STAs for each MAG includes a final destination of each STA to a corresponding MAG in the plurality of MAGs.

* * * * *